US008352635B2

(12) United States Patent
Fein et al.

(10) Patent No.: US 8,352,635 B2
(45) Date of Patent: *Jan. 8, 2013

(54) GEOLOCATION ASSISTED DATA FORWARDING STORAGE

(75) Inventors: Gene Fein, Malibu, CA (US); Edward Merritt, Lenox, MA (US)

(73) Assignee: Tajitshu Transfer Limited Liability Company, Wilmington, DE (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/119,133

(22) PCT Filed: Sep. 25, 2009

(86) PCT No.: PCT/US2009/058368
§ 371 (c)(1),
(2), (4) Date: Mar. 15, 2011

(87) PCT Pub. No.: WO2010/036887
PCT Pub. Date: Apr. 1, 2010

(65) Prior Publication Data
US 2011/0170547 A1    Jul. 14, 2011

Related U.S. Application Data

(63) Continuation of application No. 12/240,925, filed on Sep. 29, 2008, now Pat. No. 7,631,051.

(51) Int. Cl.
*G06F 15/167* (2006.01)
*G06F 15/173* (2006.01)
*H04L 12/56* (2006.01)

(52) U.S. Cl. .......................... 709/238; 709/216; 370/392

(58) Field of Classification Search .................. 709/216, 709/238; 370/392
See application file for complete search history.

(56) References Cited

U.S. PATENT DOCUMENTS

| 3,786,424 A | 1/1974 | McVoy et al. |
| 5,751,928 A | 5/1998 | Bakalash |
| 5,787,258 A | 7/1998 | Costa et al. |
| 5,978,839 A | 11/1999 | Okuhara et al. |
| 6,085,030 A | 7/2000 | Whitehead et al. |

(Continued)

FOREIGN PATENT DOCUMENTS
EP    0 458 567    5/1991
(Continued)

OTHER PUBLICATIONS

Akasaka, Tsutomu, "Remote Copy Technology of ETERNUS6000 and ETERNUS3000 Disk Arrays", Fujitsu Sci. Tech. J., Jan. 2006, vol. 42, Issue 1, pp. 9-16.

(Continued)

*Primary Examiner* — Jerry Dennison
(74) *Attorney, Agent, or Firm* — Knobbe, Martens, Olson & Bear LLP

(57) ABSTRACT

A method includes, in a network of interconnected computer system nodes, receiving a request from a source system to store data, directing the data to a computer memory in conjunction with its geolocation, geolocation enabling selecting nodes that are proximate to each other or a user to increase speed and efficiency, and continuously forwarding the data from one computer memory to another computer memory in the network of interconnected computer system nodes in conjunction with their geolocations without storing on any physical storage device in the network.

18 Claims, 4 Drawing Sheets

U.S. PATENT DOCUMENTS

| | | | |
|---|---|---|---|
| 6,151,395 | A | 11/2000 | Harkins |
| 6,205,478 | B1 | 3/2001 | Sugano et al. |
| 6,260,159 | B1 | 7/2001 | Garnett et al. |
| 6,298,380 | B1 | 10/2001 | Coile et al. |
| 6,505,213 | B1 | 1/2003 | Kamada et al. |
| 6,549,957 | B1 | 4/2003 | Hanson et al. |
| 6,587,866 | B1 | 7/2003 | Modi et al. |
| 6,650,640 | B1 | 11/2003 | Muller et al. |
| 6,677,976 | B2 | 1/2004 | Parker et al. |
| 6,684,258 | B1 | 1/2004 | Gavin et al. |
| 6,721,275 | B1 | 4/2004 | Rodeheffer et al. |
| 6,724,767 | B1 | 4/2004 | Chong et al. |
| 6,745,289 | B2 | 6/2004 | Gruner et al. |
| 6,907,447 | B1 | 6/2005 | Cooperman et al. |
| 6,941,338 | B1 | 9/2005 | Madsen |
| 6,983,303 | B2 | 1/2006 | Pellegrino et al. |
| 6,985,476 | B1 | 1/2006 | Elliott et al. |
| 7,007,142 | B2 | 2/2006 | Smith |
| 7,035,933 | B2 | 4/2006 | O'Neal et al. |
| 7,043,530 | B2 | 5/2006 | Isaacs et al. |
| 7,061,923 | B2 | 6/2006 | Dugan et al. |
| 7,103,824 | B2 | 9/2006 | Halford |
| 7,120,631 | B1 | 10/2006 | Vahalia et al. |
| 7,136,638 | B2 | 11/2006 | Wacker et al. |
| 7,143,170 | B2 | 11/2006 | Swildens et al. |
| 7,191,298 | B2 | 3/2007 | Kaminsky et al. |
| 7,197,576 | B1 | 3/2007 | Lo et al. |
| 7,209,973 | B2 | 4/2007 | Tormasov et al. |
| 7,240,214 | B2 | 7/2007 | Gazzetta et al. |
| 7,266,776 | B2 | 9/2007 | Quillen et al. |
| 7,274,706 | B1 | 9/2007 | Nguyen et al. |
| 7,277,941 | B2 | 10/2007 | Ignatius et al. |
| 7,295,556 | B2 | 11/2007 | Roese et al. |
| 7,320,059 | B1 | 1/2008 | Armangau et al. |
| 7,327,731 | B1 | 2/2008 | Kumar et al. |
| 7,346,063 | B1 | 3/2008 | Herbst |
| 7,346,909 | B1 | 3/2008 | Eldar et al. |
| 7,356,540 | B2 | 4/2008 | Smith et al. |
| 7,356,567 | B2 | 4/2008 | Odell et al. |
| 7,363,316 | B2 | 4/2008 | Anderson et al. |
| 7,366,868 | B2 | 4/2008 | Reuter et al. |
| 7,404,002 | B1 | 7/2008 | Pereira |
| 7,424,514 | B2 | 9/2008 | Noble et al. |
| 7,426,471 | B1 | 9/2008 | Briscoe et al. |
| 7,426,574 | B2 | 9/2008 | Liao |
| 7,426,637 | B2 | 9/2008 | Risan et al. |
| 7,426,745 | B2 | 9/2008 | McCarty |
| 7,428,219 | B2 | 9/2008 | Khosravi |
| 7,428,540 | B1 | 9/2008 | Coates et al. |
| 7,430,584 | B1 | 9/2008 | Fein et al. |
| 7,529,784 | B2 | 5/2009 | Kavuri et al. |
| 7,599,997 | B1 | 10/2009 | Fein et al. |
| 7,631,051 | B1 | 12/2009 | Fein et al. |
| 7,631,052 | B2 | 12/2009 | Fein et al. |
| 7,636,758 | B1 | 12/2009 | Fein et al. |
| 7,636,759 | B1 | 12/2009 | Fein et al. |
| 7,636,760 | B1 | 12/2009 | Fein et al. |
| 7,636,761 | B1 | 12/2009 | Fein et al. |
| 7,636,762 | B1 | 12/2009 | Fein et al. |
| 7,636,763 | B1 | 12/2009 | Fein et al. |
| 7,636,764 | B1 | 12/2009 | Fein et al. |
| 7,668,926 | B2 | 2/2010 | Fein et al. |
| 7,668,927 | B2 | 2/2010 | Fein et al. |
| 7,673,009 | B2 | 3/2010 | Fein et al. |
| 7,685,248 | B1 | 3/2010 | Fein et al. |
| 7,844,695 | B2 | 11/2010 | Fein et al. |
| 7,877,456 | B2 | 1/2011 | Fein et al. |
| 7,924,888 | B2 | 4/2011 | Schultze et al. |
| 2002/0158899 | A1 | 10/2002 | Raymond |
| 2002/0194371 | A1 | 12/2002 | Kadoi |
| 2003/0093463 | A1 | 5/2003 | Graf |
| 2003/0101200 | A1 | 5/2003 | Koyama et al. |
| 2003/0137880 | A1 | 7/2003 | Barrenscheen et al. |
| 2003/0158958 | A1 | 8/2003 | Chiu |
| 2004/0064633 | A1 | 4/2004 | Oota |
| 2004/0093390 | A1 | 5/2004 | Oberdorfer |
| 2004/0165525 | A1 | 8/2004 | Burak |
| 2004/0223503 | A1 | 11/2004 | Lynch et al. |
| 2004/0250029 | A1 | 12/2004 | Ji et al. |
| 2005/0010647 | A1 | 1/2005 | Durham |
| 2005/0010685 | A1* | 1/2005 | Ramnath et al. ............... 709/238 |
| 2005/0015466 | A1 | 1/2005 | Tripp |
| 2005/0044162 | A1 | 2/2005 | Liang et al. |
| 2005/0071568 | A1 | 3/2005 | Yamamoto et al. |
| 2005/0201409 | A1 | 9/2005 | Griswold et al. |
| 2005/0216473 | A1 | 9/2005 | Aoyagi |
| 2005/0216727 | A1 | 9/2005 | Chattopadhyay et al. |
| 2005/0240749 | A1 | 10/2005 | Clemo et al. |
| 2005/0243823 | A1 | 11/2005 | Griswold et al. |
| 2006/0031593 | A1 | 2/2006 | Sinclair |
| 2006/0091007 | A1 | 5/2006 | Inoue et al. |
| 2006/0095512 | A1 | 5/2006 | Noma |
| 2006/0143505 | A1 | 6/2006 | Olarig |
| 2006/0159456 | A1 | 7/2006 | Gumaste et al. |
| 2006/0209822 | A1 | 9/2006 | Hamamoto et al. |
| 2006/0212551 | A1 | 9/2006 | Kao et al. |
| 2006/0242212 | A1 | 10/2006 | Brinkmann et al. |
| 2007/0005694 | A1 | 1/2007 | Popkin et al. |
| 2007/0011097 | A1 | 1/2007 | Eckleder |
| 2007/0050446 | A1 | 3/2007 | Moore |
| 2007/0050761 | A1 | 3/2007 | Hester et al. |
| 2007/0055765 | A1 | 3/2007 | Lisiecki et al. |
| 2007/0058606 | A1 | 3/2007 | Koskelainen |
| 2007/0073965 | A1 | 3/2007 | Rajakarunanayake |
| 2007/0079087 | A1 | 4/2007 | Wang et al. |
| 2007/0186068 | A1 | 8/2007 | Agrawal |
| 2007/0195772 | A1 | 8/2007 | Shadish |
| 2007/0214105 | A1 | 9/2007 | Sfarti et al. |
| 2007/0266220 | A1 | 11/2007 | Nelson |
| 2007/0271349 | A1 | 11/2007 | Clemo et al. |
| 2008/0013448 | A1 | 1/2008 | Horie et al. |
| 2008/0016564 | A1 | 1/2008 | Claudatos et al. |
| 2008/0037777 | A1 | 2/2008 | Ignatius et al. |
| 2008/0059495 | A1 | 3/2008 | Kiessig et al. |
| 2008/0071855 | A1 | 3/2008 | Farber et al. |
| 2008/0084330 | A1 | 4/2008 | Picard |
| 2008/0091744 | A1 | 4/2008 | Shitomi et al. |
| 2008/0095075 | A1 | 4/2008 | Monier |
| 2008/0101277 | A1 | 5/2008 | Taylor et al. |
| 2008/0104085 | A1 | 5/2008 | Papoutsakis et al. |
| 2008/0114891 | A1 | 5/2008 | Pereira |
| 2008/0144655 | A1 | 6/2008 | Beam et al. |
| 2008/0151893 | A1 | 6/2008 | Nordmark et al. |
| 2008/0155094 | A1 | 6/2008 | Roese et al. |
| 2008/0155252 | A1 | 6/2008 | Nambiar |
| 2008/0155275 | A1 | 6/2008 | Natarajan et al. |
| 2008/0155537 | A1 | 6/2008 | Dinda et al. |
| 2008/0181224 | A1 | 7/2008 | Van Hensbergen et al. |
| 2008/0222415 | A1 | 9/2008 | Munger et al. |
| 2008/0222492 | A1 | 9/2008 | Earhart et al. |
| 2008/0225842 | A1 | 9/2008 | Goldfein et al. |
| 2008/0225888 | A1 | 9/2008 | Valluri et al. |
| 2008/0228943 | A1 | 9/2008 | Balus et al. |
| 2008/0313318 | A1 | 12/2008 | Vermeulen et al. |
| 2009/0006808 | A1 | 1/2009 | Blumrich et al. |
| 2009/0063419 | A1 | 3/2009 | Nurminen et al. |
| 2009/0067322 | A1 | 3/2009 | Shand et al. |
| 2009/0092124 | A1 | 4/2009 | Singhal et al. |
| 2009/0141621 | A1 | 6/2009 | Fan et al. |
| 2009/0204320 | A1 | 8/2009 | Shaffer et al. |
| 2009/0234933 | A1 | 9/2009 | Fein et al. |
| 2009/0238167 | A1 | 9/2009 | Fein et al. |
| 2009/0254567 | A1 | 10/2009 | Fein et al. |
| 2009/0300635 | A1 | 12/2009 | Ferris |
| 2010/0185581 | A1 | 7/2010 | Bakalash |
| 2011/0125721 | A1 | 5/2011 | Fein |
| 2011/0138075 | A1 | 6/2011 | Fein |
| 2011/0167131 | A1 | 7/2011 | Fein |
| 2011/0179131 | A1 | 7/2011 | Fein |

FOREIGN PATENT DOCUMENTS

| | | |
|---|---|---|
| EP | 0 722 591 | 6/1999 |
| EP | 1 048 998 | 11/2000 |
| EP | 1 968 257 | 9/2003 |
| EP | 1 357 476 A | 10/2003 |
| EP | 1406446 A1 | 4/2004 |
| EP | 1 802 051 | 11/2006 |

| | | |
|---|---|---|
| EP | 1322068 B1 | 11/2006 |
| EP | 1 746 790 | 1/2007 |
| EP | 1 372 316 | 5/2007 |
| EP | 1798934 A1 | 6/2007 |
| EP | 1798937 A1 | 6/2007 |
| EP | 1826968 A1 | 8/2007 |
| EP | 1485787 B1 | 10/2007 |
| EP | 1776639 B1 | 12/2007 |
| EP | 1479236 B1 | 1/2008 |
| EP | 1 931 090 | 6/2008 |
| JP | 56-116144 | 9/1981 |
| JP | 56-116145 | 9/1981 |
| JP | 61-165889 | 7/1986 |
| JP | 06-068047 | 3/1994 |
| JP | 10-254761 | 9/1998 |
| JP | 2002-268952 | 9/2002 |
| JP | 2005-070987 | 3/2005 |
| JP | 2005-216241 | 8/2005 |
| JP | 2005-339325 | 12/2005 |
| JP | 2007-310673 | 11/2007 |
| JP | 2008-052340 | 3/2008 |
| JP | 2011-519097 | 6/2011 |
| WO | WO 94/04991 | 3/1994 |
| WO | WO 01/67303 | 9/2001 |
| WO | WO 02/052417 | 7/2002 |
| WO | WO 2004/059529 | 7/2004 |
| WO | WO 2005/062578 | 7/2005 |
| WO | WO 2006/115594 | 11/2006 |
| WO | WO 2006/124084 | 11/2006 |
| WO | WO 2006/124217 | 11/2006 |
| WO | WO 2007/001631 | 1/2007 |
| WO | WO 2007/031593 | 3/2007 |
| WO | WO 2008/006079 | 1/2008 |
| WO | WO 2008/070958 | 6/2008 |
| WO | WO 2008/094930 | 8/2008 |
| WO | WO 2008/108699 | 9/2008 |
| WO | WO 2008/109390 | 9/2008 |
| WO | WO 2009/021289 | 2/2009 |
| WO | WO 2009/117259 | 9/2009 |
| WO | WO 2009/126418 | 10/2009 |
| WO | WO 2009/132345 | 10/2009 |
| WO | WO 2009/137571 | 11/2009 |
| WO | WO 2010/005928 | 1/2010 |
| WO | WO 2010/005935 | 1/2010 |
| WO | WO 2010/014368 | 2/2010 |
| WO | WO 2010/036712 | 4/2010 |
| WO | WO 2010/036881 | 4/2010 |
| WO | WO 2010/036883 | 4/2010 |
| WO | WO 2010/036886 | 4/2010 |
| WO | WO 2010/036887 | 4/2010 |
| WO | WO 2010/036891 | 4/2010 |

OTHER PUBLICATIONS

Amazon Elastic Compute Cloud (Amazon EC2)—Limited Beta, Amazon.com: Amazon EC2, Amazon Elastic Compute Cloud, Virtual Grid Computing: . . . p. 1 of 9, http://web.archive.org/web/20070705164650rn_2/www.amazon.com/b?ie=UTF8&node=2 . . . Jun. 18, 2010.
Aref, et al.: "Nile: A Query Processing Engine for Data Streams", Department of Computer Sciences Purdue University, West Lafayette, IN., USA, Data Engineering, 2004. Proceedings. 20th International Conference on Mar. 30-Apr. 2, 2004.
Ari, Ismail: "Design and Management of Globally-Distributed Network Caches", University of California Santa Cruz, Sep. 2004, 220 pages.
Cheeha Kim, "An Efficient Multicast Data Forwarding Scheme for Mobile Ad Hoc Networks", Information Networking, Convergence in Broadband and Mobile Networking, International Conf., Lecture Notes in Computer Science, Jan. 31-Feb. 2, 2005, vol. 3391/2005, 510-519, DOI: 10.1007/978-3-540-30582-8_53.
EPO Exam Report re App. No. 09723251.6, dated Nov. 11, 2010.
Ertaul et al.: "ECC Based Threshold Cryptography for Secure Data Forwarding and Secure Key Exchange in MANET (I)", LNCS 3462, pp. 102-113, Networking 2005, May 2-6, 2005 University of Waterloo, Waterloo Ontario Canada.
Ertaul et al: "Implementation of Homomorphic Encryption Schemes for Secure Packet Forwarding in Mobile Ad Hoc Networks (MANETs)", IJCSNS, vol. 7, Issue No. 11, pp. 132-141, Nov. 2007.
Girao et al.: "TinyPEDS: Tiny Persistent Encrypted Data Storage in Asynchronous Wireless Sensor Networks", Ad Hoc Networks, vol. 5, Issue 7, p. 1073-1089 (Sep. 2007).
Hoke, et al.: "InteMon: Continuous Mining of Sensor Data in Large-scale Self-Infrastructures", Carnegie Mellon University. Appears in ACM SIGOPS Operating Systems Review, 40(3): pp. 38-44. ACM Press, Jul. 2006.
Huang et al., "Secure Data Forwarding in Wireless Ad Hoc Networks", IEEE International Conference, May 16-20, 2005, pp. 3535-3531, vol. 5.
Ito, Takeshi et al. "Technologies of ETERNUSVS900 Storage Virtualization Switch", Fujitsu Sci. Tech. J., Jan. 2006, vol. 42, Issue 1, pp. 17-23.
Ji, Lusheng et al., "On Providing Secure and Portable Wireless Data Networking Services: Architecture and Data Forwarding Mechanisms", IPSJ Journal, Oct. 2004, vol. 45, Issue 10, pp. 2261-2269.
Kim, Youngmin, "An Efficient Multicast Data Forwarding Scheme for Mobile Ad Hoc Networks", Information Networking, Convergence in Broadband and Mobile Networking, International Conf., 2005, vol. ICOIN 2005, Jeju Island, Korea, Jan. 31-Feb. 2, 2005.
Komandur et al., "SPAM: A Data Forwarding Model for Multipoint-to-Multipoint Connection Support in ATM Networks", IC3N, IEEE Computer Society, Sep. 1997, pp. 1-7.
Mellor, Chris: "Storage in the cloud—Doppler shift or marketing gloss?", Storage in the cloud—Feature—Techworld.com, Published: 12:00, Dec. 18, 2007, http://features.techworld.com/storage/3893/storage-in-the-cloud/.
PCT International Preliminary Report and Report on Patentability re App. No. PCT/US2009/49763, dated Jan. 20, 2011.
PCT International Preliminary Report on Patentability and Written Opinion re App. No. PCT/US2009/041817, dated Oct. 26, 2010.
PCT International Preliminary Report on Patentability and Written Opinion re App. No. PCT/US2009/042971, dated Nov. 9, 2010.
PCT International Preliminary Report on Patentability and Written Opinion re App. No. PCT/US2009/49755, dated Jan. 20, 2011.
PCT International Preliminary Report on Patentability and Written Opinion re App. No. PCT/US2009/58052, dated Mar. 29, 2011.
PCT International Preliminary Report on Patentability and Written Opinion re App. No. PCT/US2009/58364, dated Mar. 29, 2011.
PCT International Preliminary Report on Patentability and Written Opinion re App. No. PCT/US2009/58367, dated Mar. 29, 2011.
PCT International Preliminary Report on Patentability and Written Opinion re App. No. PCT/US2009/58368, dated Mar. 29, 2011.
PCT International Preliminary Report on Patentability and Written Report re App. No. PCT/US2009/58376, dated Mar. 29, 2011, mailed on Apr. 7, 2011.
PCT International Report on Patentability and Written Opinion Re PCT/US2009/036171 dated Sep. 21, 2010.
PCT International Report on Patentability and Written Opinion re PCT/US2009/037579, dated Oct. 12, 2010.
PCT International Report on Patentability re App. No. PCT/US2009/50008, dated Feb. 10, 2011.
PCT International Search Report and Written Opinion, PCT/US2009/036171, dated Sep. 4, 2009 in 13 pgs.
PCT International Search Report and Written Opinion, PCT/US2009/037579, dated Jun. 24, 2009, 12 pages.
PCT International Search Report re App. No. PCT/US2009/41817, dated Jun. 30, 2009.
PCT International Search Report re App. No. PCT/US2009/42971, dated Jun. 24, 2009.
PCT International Search Report re App. No. PCT/US2009/49755, dated Aug. 7, 2009.
PCT International Search Report re App. No. PCT/US2009/49763, dated Oct. 16, 2009.
PCT International Search Report re App. No. PCT/US2009/50008, dated Aug. 11, 2009.
PCT International Search Report re App. No. PCT/US2009/58052, dated Nov. 4, 2009.
PCT International Search Report re App. No. PCT/US2009/58362, dated Nov. 2, 2009.

PCT International Search Report re App. No. PCT/US2009/58368, dated Oct. 26, 2009.
PCT International Search Report re App. No. PCT/US2009/58376, dated Oct. 28, 2009.
PCT International Search Report, re App. No. PCT/US2009/58364, dated Nov. 4, 2009.
PCT International Search Report, re App. No. PCT/US2009/58367, dated Oct. 26, 2009.
Sharma, et al.: "Data Warehouse and Olap Technology Part-1", power point presentation, first cited on Sep. 29, 2008 in U.S. Appl. No. 12/241,003.
Stefansson, et al.: "MyriadStore: Technical Report", Swedish Institute of Computer Science (SICS), Technical Report T2006:09, ISSN 1100-3154, ISRN: SCIS-T02006/09-SE. May 3, 2006 in 13 pages.
U. S. Non-Final Office Action mailed May 14, 2009, re U.S. Appl. No. 12/132,804.
U. S. Notice of Allowance mailed Aug. 7, 2008, re U.S. Appl. No. 12/046,757.
U. S. Notice of Allowance mailed Jul. 15, 2009, re U.S. Appl. No. 12/132,804.
U. S. Notice of Allowance mailed Jul. 26, 2010, re U.S. Appl. No. 12/240,802.
U. S. Notice of Allowance mailed Sep. 15, 2010, re U.S. Appl. No. 12/099,498.
U. S. Office Action re U.S. Appl. No. 12/240,757, dated Jun. 22, 2009.
U.S. Non-Final Office Action mailed Apr. 16, 2010, re U.S. Appl. No. 12/099,498.
Wagner, et al.: "A Network Application Programming Interface for Data Processing in Sensor Networks", Rice University Technical Report TREE0705. 10 pages, Submitted to IPSN (Jan. 2007)—http://www.citeulike.org/user/leosteinfeld/article/5146294.
Australian Office Action re AU Application No. 2009240392, dated May 1, 2012.
Australian Office Action re AU Application No. 2009268792, dated Jun. 8, 2012.
Australian Office Action, re AU Application No. 2009296496, dated May 23, 2012.
Japanese Office Action (Notice of Rejection), re JP Application No. JP 2011-500858, dated May 29, 2012.
Japanese Office Action re JP Application No. JP 2011-521163, dated May 23, 2012.
Korean Office Action, re KR Application No. 10-2011-7000703, dated Jul. 16, 2012.
Wojciech Purczynski et al.: "Juggling with packets: floating data storage," Internet Archive, Oct. 2003. [retrieved on Apr. 25, 2012]. Retrieved from the Internet:<URL: http://web.archive.org/web/20031017082346/http://lcamtuf.coredump.cx/juggling_with_packets.txt.
European Office Action, re EP Application No. 09795041, dated Aug. 9, 2012.
U. S. Interview Summary mailed Aug. 8, 2012, re U.S. Appl. No. 12/989,638.
European Extended Search Report, re EP Application No. 09816904.8, dated Feb. 6, 2012.
Australian Office Action, re AU Application No. 2009-268716, dated Feb. 29, 2012.
Japanese Office Action, re JP Application No. 2011-506496, dated Mar. 21, 2012.
U.S. Notice of Allowance re U.S. Appl. No. 12/052,345, dated Dec. 29, 2011.
EPO, Extended Search Report re EPO App. No. 09734559.9, dated Jul. 25, 2011.
Pakkala, D. et al.: "Towards a Peer-to-Peer Extended Content Delivery Network", pp. 1-5, XP002615892, retrieved from the Internet: Url:http://www.eurasip.org/Proceedings/Ext/IST05/papers/99.pdf on Jan. 7, 2011.
Pierre, G. et al.: "Globule: A Collaborative Content Delivery Network", IEEE Communications Magazine, vol. 44, No. 8, Aug. 1, 2006, pp. 127-133.
Tanenbaum, Andrew S.: "Network Protocols", Computing Surveys, vol. 13, No. 4, Dec. 1, 1981, pp. 453-489.
Japanese Office Action re JP Application No. 2011-529255, dated Apr. 26, 2012.
Japanese Office Action, re JP App. No. 2011-529258, dated Apr. 26, 2012.
Purczynski, et al.: "Juggling with packets: floating data storage," Internet Archive, Oct. 2003. [retrieved on Apr. 25, 2012]. Retrieved from the Internet: <URL: http://web.archive.org/web/20031017082346/http://lcamtuf.coredump.cx/juggling_with_packets.txt>.
U.S. Office Action re U.S. Appl. No. 12/052,345, dated Oct. 4, 2011.
U. S. Office Action re U.S. Appl. No. 13/003,505, dated Aug. 22, 2012.
European Extended Search Report, re EP Application No. 09795041, dated Oct. 11, 2011.
Japanese Office Action dated Apr. 13, 2012, re JP App. No. 2011-517515.
U.S. Notice of Allowance re U.S. Appl. No. 12/052,345, dated Apr. 2, 2012.

* cited by examiner

GEOLOCATION ASSISTED DATA FORWARDING STORAGE

CROSS REFERENCE TO RELATED APPLICATIONS

This application is a U.S. National Phase of International Application No. PCT/US2009/058368, filed Sep. 25, 2009 which is a continuation of U.S. patent application Ser. No. 12/240,925, filed Sep. 29, 2008, now U.S. Pat. No. 7,631,051, entitled "GEOLOCATION ASSISTED DATA FORWARDING STORAGE," each of which is hereby expressly incorporated by reference in its entirety.

BACKGROUND

At least some embodiments disclosed herein relate to data storage, and more particularly, to geolocation assisted data forwarding storage.

The volume of data that must be stored by individuals, organizations, businesses and government is growing every year. In addition to just keeping up with demand, organizations face other storage challenges. With the move to on-line, real-time business and government, critical data must be protected from loss or inaccessibility due to software or hardware failure. Today, many storage products do not provide complete failure protection and expose users to the risk of data loss or unavailability. For example, many storage solutions on the market today offer protection against some failure modes, such as processor failure, but not against others, such as disk drive failure. Many organizations are exposed to the risk of data loss or data unavailability due to component failure in their data storage system.

The data storage market is typically divided into two major segments, i.e., Direct Attached Storage (DAS) and Network Storage. DAS includes disks connected directly to a server.

Network Storage includes disks that are attached to a network rather than a specific server and can then be accessed and shared by other devices and applications on that network. Network Storage is typically divided into two segments, i.e., Storage Area Networks (SANs) and Network Attached Storage (NAS).

A SAN is a high-speed special-purpose network (or sub-network) that interconnects different kinds of data storage devices with associated data servers on behalf of a larger network of users. Typically, a SAN is part of the overall network of computing resources for an enterprise. A storage area network is usually clustered in close proximity to other computing resources but may also extend to remote locations for backup and archival storage, using wide area (WAN) network carrier technologies.

NAS is hard disk storage that is set up with its own network address rather than being attached to the local computer that is serving applications to a network's workstation users. By removing storage access and its management from the local server, both application programming and files can be served faster because they are not competing for the same processor resources. The NAS is attached to a local area network (typically, an Ethernet network) and assigned an IP address. File requests are mapped by the main server to the NAS file server.

All of the above share one common feature that can be an Achilles tendon in more ways than one, i.e., data is stored on a physical medium, such as a disk drive, CD drive, and so forth.

SUMMARY OF THE DESCRIPTION

The present invention provides methods and apparatus, including computer program products, for geolocation assisted data forwarding storage.

In general, in one aspect, the invention features, a method including, in a network of interconnected computer system nodes, receiving a request from a source system to store data, directing the data to a computer memory in conjunction with its geolocation, geolocation enabling selecting nodes that are proximate to each other or a user to increase speed and efficiency, and continuously forwarding the data from one computer memory to another computer memory in the network of interconnected computer system nodes in conjunction with their geolocations without storing on any physical storage device in the network, geolocation enabling selecting nodes that are proximate to each other or the user to increase speed and efficiency.

In another aspect, the invention features a network including a group of interconnected computer system nodes each receiving data and continuously forwarding the data from computer memory to computer memory in conjunction with IP address geolocations without storing on any physical storage device in response to a request to store data from a requesting system and retrieve data being continuously forwarded from computer memory to computer memory in response to a request to retrieve data from the requesting system, each node further configured to detect the presence of data in its memory, apply a time stamp, and forward the data to computer memory of another node in the interconnected computer systems nodes according to a node's availability and geolocation, geolocation enabling selecting nodes that are proximate to each other or a user to increase speed and efficiency.

The details of one or more implementations of the invention are set forth in the accompanying drawings and the description below. Further features, aspects, and advantages of the invention will become apparent from the description, the drawings, and the claims.

BRIEF DESCRIPTION OF THE DRAWINGS

The embodiments are illustrated by way of example and not limitation in the FIGs. of the accompanying drawings in which like references indicate similar elements.

DETAILED DESCRIPTION

Unlike peer to peer networks, which use data forwarding in a transient fashion so that data is eventually stored on a physical medium such as a disk drive, the present invention is a continuous data forwarding system, i.e., data is stored by continually forwarding it from one node memory to another node memory.

Figure 1:
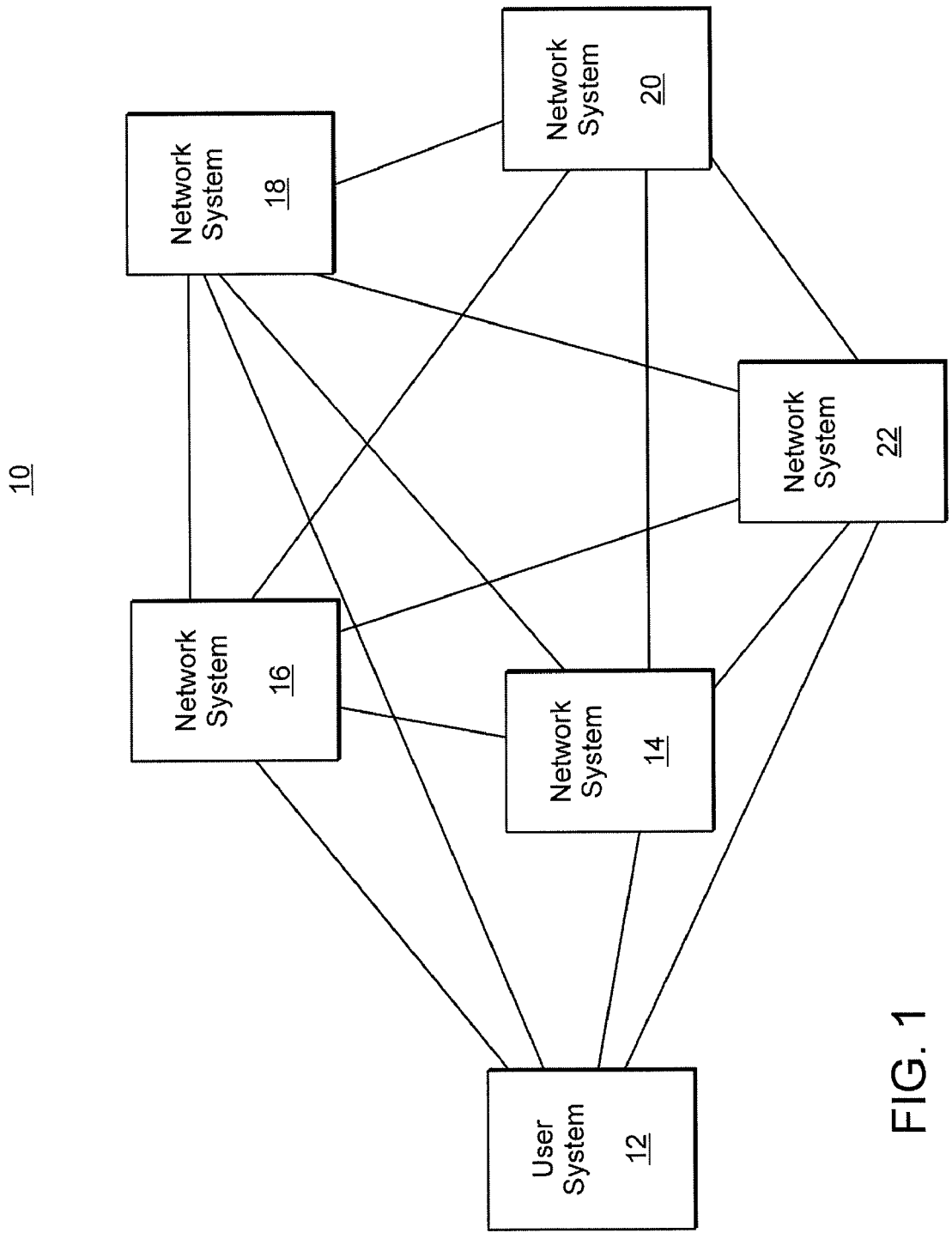
FIG. 1 is a block diagram of an exemplary network.

As shown in FIG. 1, an exemplary network 10 includes a user system 12 and a number of network systems 14, 16, 18, 20, 22. Each of the network systems 14, 16, 18, 20, 22 can be considered to be a node in the network 10 and one such network system may be designated as a central server, such as network system 14, which may assume a control position in network 10. Each of the nodes 14, 16, 18, 20, 22 may be established as a privately controlled network of peers under direct control of the central server 14. Peered nodes may also be a mix of private and public nodes, and thus not under the direct physical control of the central server 14. The network 10 may also be wholly public where the central server 14 (or servers) has no direct ownership or direct physical control of any of the peered nodes.

Figure 2:
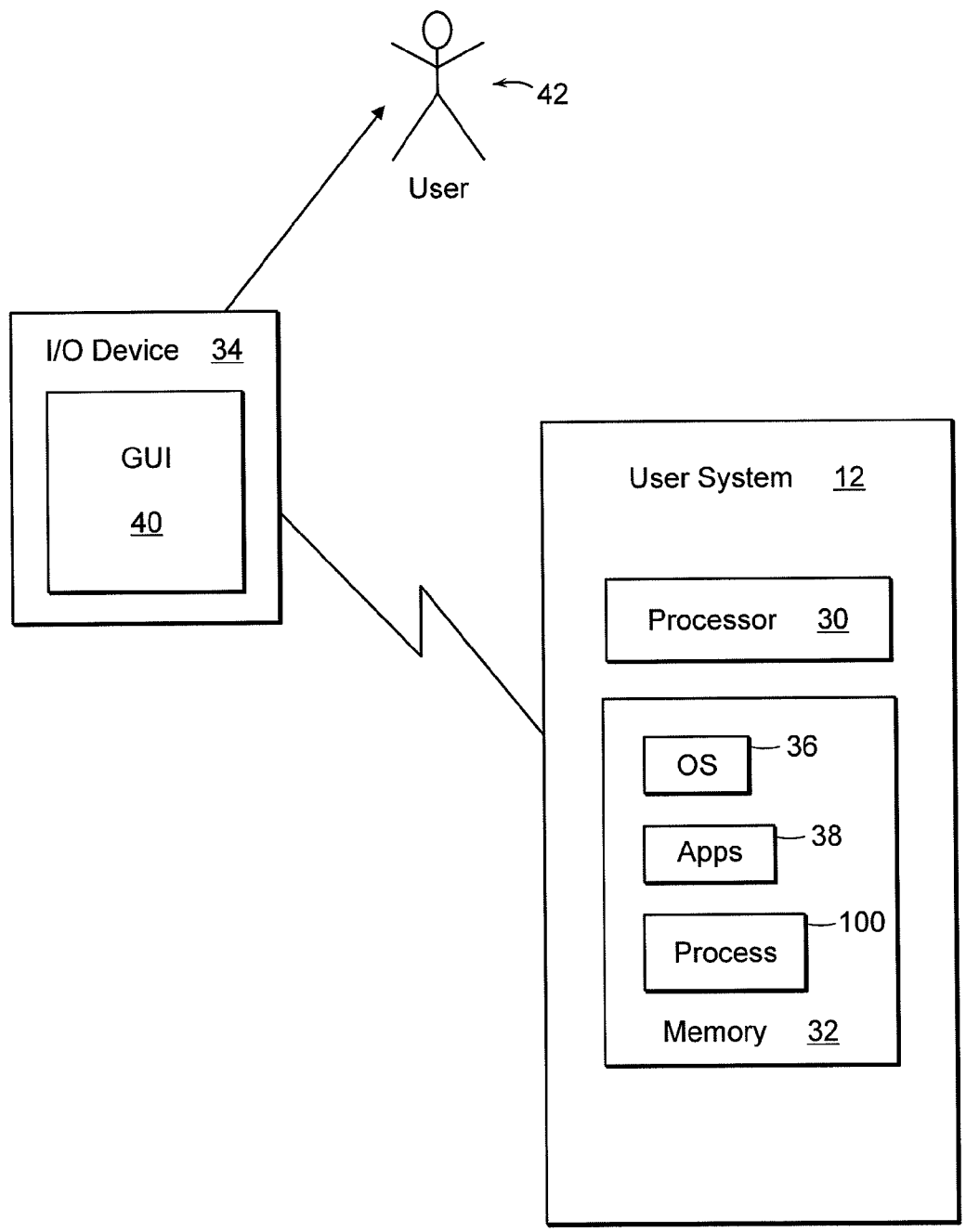
FIG. 2 is a block diagram of an exemplary user system.

As shown in FIG. 2, the user system 12 can include a processor 30, memory 32 and input/output (I/O) device 34. Memory 32 can include an operating system (OS) 36, such as Linux, Apple® OS or Windows®, one or more application processes 38, and a storage process 100, explained in detail below. Application processes 38 can include user productivity software, such as OpenOffice or Microsoft® Office. The I/O device 34 can include a graphical user interface (GUI) 40 for display to a user 42.

Figure 3:
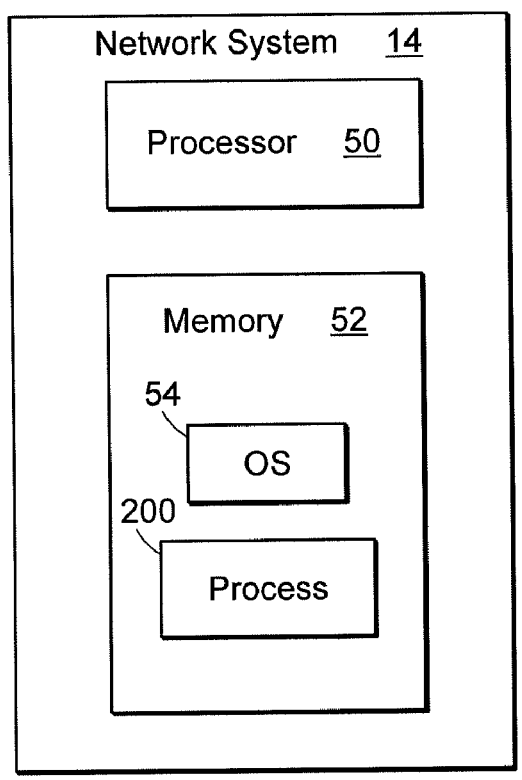
FIG. 3 is a block diagram of an exemplary network system.

As shown in FIG. 3, each of the network systems, such as network system 14, can include a processor 50 and memory 52. Memory 52 can include an OS 54, such as Linux, Apple® OS or Windows®, and a data forwarding process 200, explained in detail below.

In traditional systems, application processes 38 need to store and retrieve data. In these traditional systems, data is stored on local or remote physical devices. And in some systems, this data can be segmented into different pieces or packets and stored locally or remotely on physical mediums of storage. Use of fixed physical data storage devices add cost, maintenance, management and generate a fixed physical record of the data, whether or not that is the desire of the user 42.

The present invention does not use fixed physical data storage to store data. When a request to store data is received by the central server 14 from storage process 100, data is directed to a node in the network 10, assisted by a geolocation of the node, where it is then continuously forwarded from node memory to node memory in the network 10 by the data forwarding process 200 in each of the network nodes without storing on any physical storage medium such as a disk drive. The forwarded data resides only for a very brief period of time in the memory of any one node in the network 10. Data is not stored on any physical storage medium in any network node. Using geolocation enables speed and efficiency in forwarding data throughout the network, i.e., by selecting nodes that are proximate to each other and/or the user.

Geolocation generally refers to identifying a real-world geographic location of an Internet connected computer, mobile device, website visitor or other. Geolocation can be used to refer to the practice of assessing the location, or it can be used to refer to the actual assessed location or location data. Geolocation can be performed by associating a geographic location with, for example, the Internet Protocol address, Media Access Control (MAC) address, Radio Frequency Identification (RFID), hardware embedded article/production number, embedded software number (such as UUID, Exif/IPTC/XMP or modern steganography), Wi-Fi connection location, or device GPS coordinates, or other, perhaps self-disclosed, information.

Networks in general, and more particularly the Internet, have become a collection of resources meant to appeal to a large general audience. Although this multitude of information has been a great boon, it also has diluted the importance of geographically localized information. Offering the ability for network users to garner information based on geographic location can decrease search times and increase visibility of local establishments. Similarly, user communities and chatrooms can be enhanced through knowing the locations (and therefore, local times, weather conditions and news events) of their members as they roam the globe. It is possible to provide user services in applications and Web sites without the need for users to carry GPS receivers or even to know where they themselves are.

Geolocation by IP address is the technique of determining a user's geographic latitude, longitude and, by inference, city, region and nation by comparing the user's public Internet IP address with known locations of other electronically neighboring servers and routers.

Possible applications for geolocation by IP address exist for Weblogs, chat programs, user communities, forums, distributed computing environments, security, urban mapping and network robustness.

Although several methods of geographically locating an individual currently exist, each system has cost and other detriments that make them technology prohibitive in computing environments. Global Positioning System (GPS) is limited by line-of-sight to the constellation of satellites in Earth's orbit, which severely limits locating systems in cities, due to high buildings, and indoors, due to complete overhead blockage. Several projects have been started to install sensors or to use broadcast television signals to provide for urban and indoor geolocation.

By contrast, these environments already are witnessing a growing trend of installing wireless access points (AP). Airports, cafes, offices and city neighborhoods all have begun installing wireless APs to provide Internet access to wireless devices. Using this available and symbiotic infrastructure, geolocation by IP address can be implemented immediately.

Several RFC proposals have been made by the Internet Engineering Task Force (IETF) that aim to provide geolocation resources and infrastructure. Several companies now offer pay-per-use services for determining location by IP.

Several years ago, CAIDA, the Cooperative Association for Internet Data Analysis, began a geolocation by IP address effort called NetGeo. This system was a publicly accessible database of geographically located IP addresses. Through the use of many complex rules, the NetGeo database slowly filled and was corrected for the location of IP addresses.

To query the NetGeo database, an HTTP request is made with the query IP address, like this:

```
----
$ http://netgeo.caida.org/perl/netgeo.cgi?target=192.168.0.1
VERSION=1.0
TARGET: 192.168.0.1
NAME: IANA-CBLK1
NUMBER: 192.168.0.0 - 192.168.255.255
CITY: MARINA DEL REY
STATE: CALIFORNIA
COUNTRY: US
LAT: 33.98
LONG: -118.45
LAT_LONG_GRAN: City
LAST_UPDATED: 16-May-2001
NIC: ARIN
LOOKUP_TYPE: Block Allocation
RATING:
DOMAIN_GUESS: iana.org
STATUS: OK
----
```

The NetGeo response includes the city, state, country, latitude and longitude of the IP address in question. Furthermore, the granularity (LAT_LONG_GRAN) also is estimated to give some idea about the accuracy of the location. This accuracy also can be deduced from the LAST_UPDATED field. Obviously, the older the update, the more likely it is that the location has changed. This is true especially for IP addresses assigned to residential customers, as companies holding these addresses are in constant flux.

Several existing packages assist in retrieving information from the NetGeo database. The PEAR system has a PHP package, and a PERL module, CAIDA::NetGeo::Client, is available. It is a relatively straightforward task to make a request in whatever language you are using for your application or service. For example, a function in PHP for getting and parsing the NetGeo response looks like this:

```
1: function getLocationCaidaNetGeo($ip)
2: {
3: $NetGeoURL = "http://netgeo.caida.org/perl/netgeo.cgi?target=".$ip;
4: 5: if($NetGeoFP = fopen($NetGeoURL,r))
6: {
7:   ob_start( );
8:
9:   fpassthru($NetGeoFP);
10:    $NetGeoHTML = ob_get_contents( );
11:    ob_end_clean( );
12:
13: fclose($NetGeoFP);
14: }
15: preg_match ("/LAT:(.*)/i", $NetGeoHTML, $temp) or die("Could not find element LAT");
16: $location[0] = $temp[1];
17: preg_match ("/LONG:(.*)/i", $NetGeoHTML, $temp) or die("Could not find element LONG");
18: $location[1] = $temp[1];
19:
20: return $location;
21: }
```

The NetGeo database slowly is becoming more inaccurate as IP address blocks change hands in company close-outs and absorptions. Several other tools are available for determining location, however. A description of the NetGeo infrastructure itself presents some of the methods it employed for mapping IP addresses and can be a source of guidance for future projects.

One of the most useful geolocation resources is DNS LOC information, but it is difficult to enforce across the Internet infrastructure. RFC 1876 is the standard that outlines "A Means for Expressing Location Information in the Domain Name System." Specifically, this is done by placing the location information of a server on the DNS registration page. Several popular servers have employed this standard but not enough to be directly useful as of yet.

To check the LOC DNS information of a server, you need to get the LOC type of the host:

```
$ host -t LOC yahoo.com
yahoo.com LOC 37 23 30.900 N 121 59 19.000 W 7.00m 100m 100m 2m
```

This parses out to 37 degrees 23' 30.900" North Latitude by 121 degrees 59' 19.000" West Longitude at 7 meters in altitude, with an approximate size of 100 meters at 100 meters horizontal precision and 2 meters vertical precision. There are several benefits to servers that offer their geographic location in this way. First, if you are connecting from a server that shows its DNS LOC information, determining your geolocation is simple, and applications may use this information without further work, although some verification may be useful. Second, if you are connecting on your second or third bounce through a server that has DNS LOC information, it may be possible to make an estimate of your location based on traffic and ping times. However, these estimates greatly degrade accuracy.

It also is possible to put the DNS LOC information for your Web site in its registration. If more servers come to use LOC information, geolocation accuracy will be much easier to attain.

"host" is a DNS lookup utility that allows users to find out various pieces of information about a host. The simplest use is doing hostname to IP address lookups and the reverse. The reverse, dotted-decimal IPv4 notation, is used for this, and the actual server that hosts the canonical name is returned. The type flag, -t, can be used to obtain specific information from the host record from the name server.

Service providers typically provide an internal naming scheme for assigning IP addresses and associating names with these addresses. Typically, the canonical name of an IP address contains the country-code top-level domain (ccTLDs) in a suffix. CN is China, FR is France, RO is Romania and so on. Furthermore, the name even may contain the city or region in which the IP address is located. Often, however, this information is shortened to some name that requires a heuristic to determine. For example, in your service or application, a user may appear to be coming from d14-69-1-64.try.wideopenwest.com. A whois at this address reveals it is a WideOpenWest account from Michigan. Using some logic, it is possible to deduce that this user is connecting through a server located in Troy, Mich., hence the .try. in the canonical name.

Some projects have been started to decipher these addresses, and you also can get all of the country codes and associated cities and regions of a country from the IANA Root-Zone Whois Information or the US Geospatial Intelligence Agency, which hosts the GEOnet Names Server (GNS). The GNS has freely available data files on almost all world countries, regions, states and cities, including their sizes, geographic locations and abbreviations, as well as other information.

Information such as that presented on the GNS also can be used to provide users with utilities and services specific to their geographical locations. For example, it is possible to determine a user's local currency, time zone and language. Time zone is especially useful for members of a community or chat group to determine when another friend may be available and on-line.

When a request to retrieve data is received by the central server 14 from storage process 100, the requested data, which is being forwarded from node memory to node memory in the network 10 assisted by geolocations of the nodes, is retrieved. Data forwarded in this manner can be segmented and segments forwarded as described above. Still, the segmented data is not stored on any physical storage medium in any network node, but merely forwarded from the memory of one node to the memory of another node.

Figure 4:
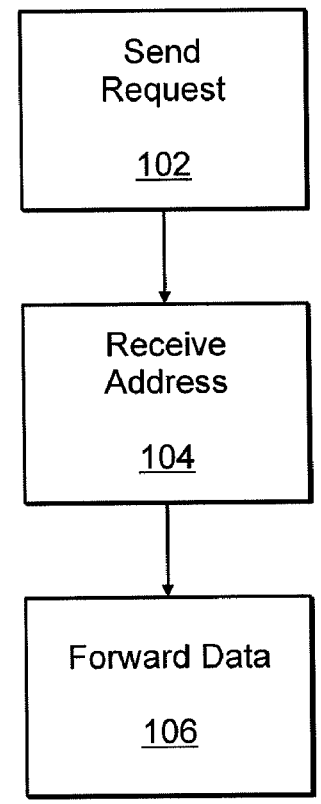
FIG. 4 is a flow diagram of a process.

As shown in FIG. 4, storage process 100 includes sending (102) a request to a central server 14 to store or retrieve data. If the request is a retrieve data request, storage process 100 receives the requested data from the central server 14 or node in the network.

If the request to the central server 14 is a store data request, storage process 100 receives (104) an address of a node from the central server 14 and forwards (106) the data to the node memory represented by the received address. The central server 14 is assisted in finding an appropriate address by a geolocation, which can help locate a node that is underutilized or light in terms of network traffic.

Figure 5:
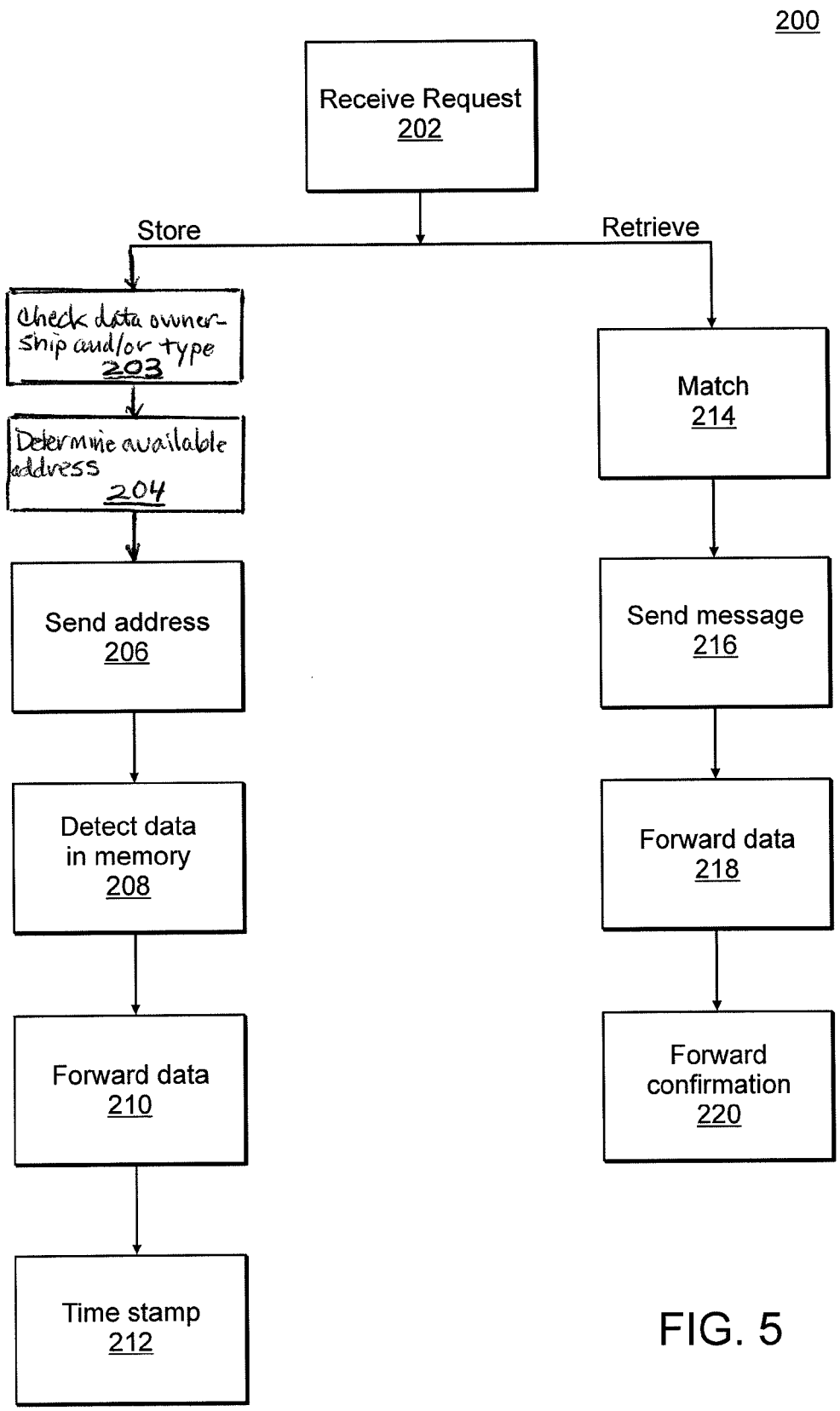
FIG. 5 is a flow diagram of a process.

As shown in FIG. 5, data forwarding process 200 includes receiving (202) a request to store or retrieve data. If the received request is a request to store data, data forwarding process 200 determines (204) an address of a node available to receive the data in memory assisted by its geolocation. This determination (204) can include using a geolocation to help locate a node, pinging the network and determining which of the nodes in a network is available, or determining which node in the network has the least traffic, or determining which node in the network has the largest available memory, or the geographic coordinates of the node, or any combination of these or other factors. Using geolocation enables greater speed and efficiency by selecting nodes that are proximate to each other and/or the user.

Process 200 sends (206) a message to the user system with the address of a specific node for the requester to forward the data.

Process 200 detects (208) the presence of data in node memory. Process 200 forwards (210) the data in memory to another node in the network of nodes, assisted by geolocation (e.g., a location of the node in the network) and continues to repeat detecting (208) and forwarding (210) of the data from node memory to node memory assisted by geolocation. When data arrives in any node memory, process 200 affixes (212) a time stamp to the data.

Forwarding (210) can include pinging the node in the network to determine which of the nodes in the network is available, or determining which node in the network has the least traffic, or determining which node in the network has the largest available memory, or any combination of these or other factors.

In one specific example, at the point of entry to a node, data undergoes an encrypted "handshake" with the node or central server 14 or user. This can be a public or private encryption system, such as the Cashmere system, which can use public-private keys. Cashmere decouples the encrypted forwarding path and message payload, which improves the performance as the source only needs to perform a single public key encryption on each message that uses the destination's unique public key. This has the benefit that only the true destination node will be able to decrypt the message payload and not every node in the corresponding relay group. Cashmere provides the capability that the destination can send anonymous reply messages without knowing the source's identity. This is done in a similar way, where the source creates a reply path and encrypts it in a similar manner as the forwarding path.

In another example, other routing schemes are utilized.

If the received request is a request to retrieve data being continuously forwarded from node memory to node memory, data forwarding process 200 matches (214) at the central server 14 using a hash mark or other unique code that can be "sniffed" by the node upon the data entering the node via the encryption handshake. This can occur by pinging the nodes in the network. Process 200 sends (216) the message to return the data to the user directly to the node or node state where the central server 14 believes the data will likely appear. The more the central server 14 can narrow the node state that it pings to, then the more efficient the retrieval will become and the less burdened by unnecessary messaging traffic to nodes that are not necessary for a transaction between the central server 14 and the node capable of forwarding the data.

Once the correct node receives the message to forward the data in node memory to the requester, process 200 forwards (218) in node memory the data to the requester and forwards (220) a confirmation message that the data has been sent to the user. This routing message may be sent directly to the central server 14 or may be passed to the central server 14 or servers via other node(s) or supernode(s) in the network 10. Upon the user receiving the requested data the user's application functions to automatically ping the central server 14 that the data requested has been received. Thus the network 10 creates data storage without caching, downloading and/or storing the data on any physical storage medium. Data storage and management is accomplished via a continuous routing of the data from node memory to node memory, the forwarded data only downloaded when the user requests the data to be returned to the user from the network 10.

New nodes and node states may be added and/or deleted from the network 10 based upon performance. Users may have access to all nodes or may be segmented to certain nodes or "node states" by the central server(s) or via the specific architecture of the private, public or private-public network.

Individual nodes, nodes states and supernodes may also be extranet peers, wireless network peers, satellite peered nodes, Wi-Fi peered nodes, broadband networks, and so forth, in public or private networks. Peered nodes or users may be used as routing participants in the network 10 from any valid peer point with the same security systems employed, as well as custom solutions suitable for the rigors of specific deployments, such as wireless encryption schemes for wireless peers, and so forth.

In process 200, rather than have data cached or held in remote servers, hard drives or other fixed storage medium, the data are passed, routed, forwarded from node memory to node memory. The data are never downloaded until the authorized user calls for the data. A user on the system may authorize more than one user to have access to the data.

A primary goal in process 200 is to generate a data storage and management system where the data is never fixed in physical storage, but in fact, is continually being routed/forwarded from node memory to node memory in the network. The path of the nodes to which data is forwarded may also be altered by the central server 14 to adjust for system capacities and to eliminate redundant paths of data that may weaken the security of the network due to the increased probability of data path without this feature.

The invention can be implemented to realize one or more of the following advantages. A network creates data storage without caching or downloads. Data storage and management are accomplished via a constant routing of the data.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A computing system comprising:
    one or more hardware processors configured to execute instructions;
    a computer readable medium storing instructions configured for execution by the one or more processors in order to cause the computing system to:
        determine geographic locations of respective computer storage nodes in a network of computer storage nodes configured to forward data items among computer storage nodes without storing the data items on any fixed storage medium within the network of computer storage nodes, wherein forwarding of the data items comprises:
            in response to receiving a data item at a particular computer storage node, determine, based on at least comparison of a geographic location of the particular computer storage node to respective geographic locations of other computer storage nodes, another computer storage node to receive the data item; and
            initiate transmission of the data item to the another computer storage node without storing the data item on any fixed storage medium of the computer storage nodes in the network.

2. The computing system of claim 1, wherein the instructions are further configured to cause the computing system to:
    receive a request from a computing device to store the data item;
    wherein the another computer storage node is determined based on comparison of the geographic location of the particular computer storage node and a geographic location of the computing device.

3. The computing system of claim 2, wherein the instructions are further configured to cause the computing system to:
    request location information associated with one or more servers through which the request was received from the computing device; and
    determine the geographic location of the computing device based on the location information.

4. The computing system of claim 1, wherein the instructions are further configured to cause the computing system to:
    receive a request from a computing device to store the data item;
    wherein the another computer storage node is determined based on comparison of respective geographic locations of computer storage nodes in the network to a geographic location of the computing device.

5. A method comprising:
    determining, by a computing system, geographic locations of respective computer storage nodes in a network of computer storage nodes configured to forward data items among computer storage nodes without storing the data items on any fixed storage medium within the network of computer storage nodes;
    in response to receiving a data item at a first computer storage node, determining, by the computing system, based on at least comparison of a geographic location of the first computer storage node to respective geographic locations of other computer storage nodes, a second computer storage node to receive the data item; and
    initiating, by the computing system, transmission of the data item to the second computer storage node without storing the data item on any fixed storage medium of the first computer storage node.

6. The method of claim 5, further comprising:
    receiving a request from a computing device to store the data item;
    wherein said determining the second computer storage node is further based on comparison of the geographic location of the first computer storage node and a geographic location of the computing device.

7. The method of claim 6, further comprising:
    requesting location information associated with one or more servers through which the request was received from the computing device; and
    determining the geographic location of the computing device based on the location information.

8. The method of claim 5, further comprising:
    receiving a request from a computing device to store the data item;
    wherein said determining the second computer storage node is further based on comparison of respective geographic locations of other computer storage nodes and a geographic location of the computing device.

9. The method of claim 5, further comprising:
    in response to receiving the data item at the second computer storage node, determining, based on at least comparison of a geographic location of the second computer storage node to respective geographic locations of other computer storage nodes, a third computer storage node to receive the data item; and
    transmitting the data item to the third computer storage node without storing the data item on any fixed storage medium of the second computer storage node.

10. The method of claim 9, further comprising:
    in response to receiving the data item at the third computer storage node, determining, based on at least comparison of a geographic location of the third computer storage node to respective geographic locations of other computer storage nodes, a fourth computer storage node to receive the data item; and
    transmitting the data item to the fourth computer storage node without storing the data item on any fixed storage medium of the third computer storage node.

11. The method of claim 5, wherein said determining geographic locations comprises:

transmitting IP addresses of respective computer storage nodes to a geolocation system; and receiving geographic locations associated with respective IP addresses from the geolocation system.

12. A non-signal computer-readable medium having instructions encoded thereon, wherein the instructions are readable by a computing system in order to cause the computing system to perform operations comprising:

determining geographic locations of respective computer storage nodes in a network of computer storage nodes configured to forward data items among computer storage nodes without storing the data items on any fixed storage medium within the network of computer storage nodes;

in response to receiving a data item at a first computer storage node, determining, based on at least comparison of a geographic location of the first computer storage node to respective geographic locations of other computer storage nodes, a second computer storage node to receive the data item; and initiating transmission of the data item to the second computer storage node without storing the data item on any fixed storage medium of the first computer storage node.

13. The non-signal computer-readable medium of claim 12, wherein the operations further comprise:

receiving a request from a computing device to store the data item;

wherein said determining the second computer storage node is further based on comparison of the geographic location of the first computer storage node and a geographic location of the computing device.

14. The non-signal computer-readable medium of claim 13, wherein the operations further comprise:

requesting location information associated with one or more servers through which the request was received from the computing device; and determining the geographic location of the computing device based on the location information.

15. The non-signal computer-readable medium of claim 12, wherein the operations further comprise:

receiving a request from a computing device to store the data item;

wherein said determining the second computer storage node is further based on comparison of respective geographic locations of other computer storage nodes and a geographic location of the computing device.

16. The non-signal computer-readable medium of claim 13, wherein the operations further comprise:

in response to receiving the data item at the second computer storage node, determining, based on at least comparison of a geographic location of the second computer storage node to respective geographic locations of other computer storage nodes, a third computer storage node to receive the data item; and transmitting the data item to the third computer storage node without storing the data item on any fixed storage medium of the second computer storage node.

17. The non-signal computer-readable medium of claim 16, wherein the operations further comprise:

in response to receiving the data item at the third computer storage node, determining, based on at least comparison of a geographic location of the third computer storage node to respective geographic locations of other computer storage nodes, a fourth computer storage node to receive the data item; and transmitting the data item to the fourth computer storage node without storing the data item on any fixed storage medium of the third computer storage node.

18. The non-signal computer-readable medium of claim 13, wherein said determining geographic locations comprises:

transmitting IP addresses of respective computer storage nodes to a geolocation system; and receiving geographic locations associated with respective IP addresses from the geolocation system.

* * * * *

UNITED STATES PATENT AND TRADEMARK OFFICE
CERTIFICATE OF CORRECTION

PATENT NO. : 8,352,635 B2
APPLICATION NO. : 13/119133
DATED : January 8, 2013
INVENTOR(S) : Fein et al.

It is certified that error appears in the above-identified patent and that said Letters Patent is hereby corrected as shown below:

Title Page 3, in item (56), under "OTHER PUBLICATIONS", in Column 1, Line 6, delete "al.:" and insert -- al., --, therefor at each occurrence throughout the Other Publications.

Title Page 3, in item (56), under "OTHER PUBLICATIONS", in Column 1, Line 8, delete "2004. Proceedings." and insert -- 2004, Proceedings --, therefor.

Title Page 3, in item (56), under "OTHER PUBLICATIONS", in Column 2, Line 1, delete "al:" and insert -- al., --, therefor.

Title Page 3, in item (56), under "OTHER PUBLICATIONS", in Column 2, Line 8, delete "University." and insert -- University, --, therefor.

Title Page 3, in item (56), under "OTHER PUBLICATIONS", in Column 2, Line 9, delete "38-44." and insert -- 38-44, --, therefor.

Title Page 3, in item (56), under "OTHER PUBLICATIONS", in Column 2, Line 14, delete "al." and insert -- al., --, therefor.

Title Page 4, in item (56), under "OTHER PUBLICATIONS", in Column 1, Line 14, delete "SCIS-T02006/09-SE." and insert -- SCIS-T02006/09-SE, --, therefor.

Title Page 4, in item (56), under "OTHER PUBLICATIONS", in Column 1, Line 31, delete "TREE0705." and insert -- TREE0705, --, therefor.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,352,635 B2

In the Drawings:

In Fig. 5, Sheet 4 of 4, delete " 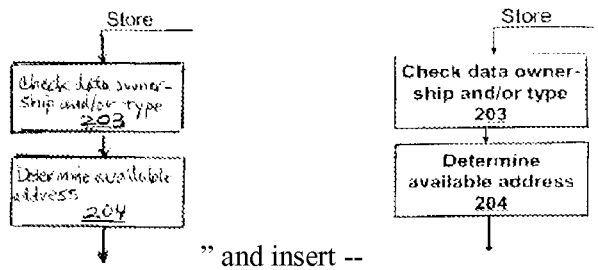 " and insert -- -- , therefor.

In the Specifications:

In Column 2, Line 41, delete "FiGs." and insert -- FIGS. --, therefor.

In Column 4, Line 22, delete "(AP)." and insert -- (APs). --, therefor.